United States Patent
Uehara

(10) Patent No.: US 10,664,974 B2
(45) Date of Patent: May 26, 2020

(54) SYSTEM AND METHOD FOR OBJECT DETECTION USING EDGE CHARACTERISTICS

(71) Applicant: Toyota Motor Engineering & Manufacturing North America, Inc., Plano, TX (US)

(72) Inventor: Yasuo Uehara, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 196 days.

(21) Appl. No.: 15/903,464

(22) Filed: Feb. 23, 2018

(65) Prior Publication Data

US 2019/0266741 A1  Aug. 29, 2019

(51) Int. Cl.
- *G06T 7/13* (2017.01)
- *G06K 9/46* (2006.01)
- *G06K 9/00* (2006.01)
- *G01S 17/931* (2020.01)

(52) U.S. Cl.
CPC ............. *G06T 7/13* (2017.01); *G01S 17/931* (2020.01); *G06K 9/00805* (2013.01); *G06K 9/4604* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 6,330,523 B1* | 12/2001 | Kacyra | G01B 11/002 250/336.1 |
| 6,448,572 B1* | 9/2002 | Tennant | G01S 7/4863 250/559.38 |
| 6,834,232 B1 | 12/2004 | Malhotra | |
| 7,995,055 B1* | 8/2011 | Ma | G06K 9/4604 345/420 |
| 8,885,925 B2 | 11/2014 | Cameron et al. | |
| 9,360,554 B2 | 6/2016 | Retterath et al. | |
| 2008/0175513 A1 | 7/2008 | Lai et al. | |
| 2017/0124714 A1 | 5/2017 | Sridhar et al. | |
| 2017/0264880 A1 | 9/2017 | Zolotov | |
| 2017/0301104 A1 | 10/2017 | Qian et al. | |
| 2018/0304468 A1* | 10/2018 | Holz | B25J 9/1697 |

* cited by examiner

*Primary Examiner* — Justin P. Misleh
(74) *Attorney, Agent, or Firm* — Christopher G. Darrow; Darrow Mustafa PC

(57) ABSTRACT

System, methods, and other embodiments described herein relate to improving detection of objects in a surrounding environment. In one embodiment, a method includes, in response to emitting a signal pulse, acquiring point cloud data about the surrounding environment as identified from the signal pulse reflecting from the surrounding environment. The method further includes determining which data points within the point cloud data are edge points by distinguishing the edge points from field points in the point cloud data according to edge characteristics. The method includes identifying an object in the surrounding environment according to a segment of the point cloud data that is bound by the edge points.

20 Claims, 7 Drawing Sheets

SYSTEM AND METHOD FOR OBJECT DETECTION USING EDGE CHARACTERISTICS

TECHNICAL FIELD

The subject matter described herein relates in general to systems and methods for improving detection of objects in a surrounding environment that are within a field of view of a sensor and, more particularly, to analyzing return signals to identify edges of objects and the objects themselves from the identified edges.

BACKGROUND

Environmental perception can be a challenge for electronic devices that use electronic sensors to perceive a surrounding environment. For example, electronic devices such as robots and vehicles may use one or more sensors to perceive aspects within the surrounding environment that are within a field of view of the sensor(s) so that the electronic devices can determine a location within the environment and map objects and obstacles. In this way, the devices can determine paths through the environment when autonomously navigating and/or provide assistance to an operator in order to avoid obstacles. For example, detection of objects within a roadway such as tire debris, small obstacles (e.g., rocks, sticks, etc.), and other objects that are relatively small in comparison to, for example, a vehicle can represent potential hazards to the vehicle that should be detected to provide for safe operation of the vehicle.

However, sensors such as light/laser detection and ranging (LiDAR/LaDAR) sensors can encounter difficulties with detecting relatively small objects. This is because these small objects may generate few return signals for the sensors to detect when scanned. As such, the sensors may perceive the smaller objects at a lower resolution because of acquiring few data points about the objects. Thus, object detection routines that analyze the generated data may miss or otherwise discard the data points associated with the objects as noise because of the lack of resolution. Accordingly, the sensors can fail to detect the objects, and the sensing systems may then not assist a driver/operator in relation to avoiding such obstacles.

SUMMARY

In one embodiment, example systems and methods relate to a manner of detecting objects according to distinct aspects of data points associated with edges of the objects. For example, in one approach, a LiDAR emits a pulse of light to scan the field of view within the surrounding environment. The LiDAR generates a point cloud from detected reflections of the pulse on objects and surfaces within the field of view. Thus, for example, a vehicle in the field of view reflects the pulse of light which is interpreted/detected by the LiDAR as many distinct points that each are associated with a distance from the LiDAR as determined according to a time for the pulse to travel from the LiDAR to the vehicle and back. Thus, the LiDAR generally implements, in one embodiment, an array of photodetectors that separately correlate with points/pixels in the point cloud.

In some instances, individual pixels, which are sensing elements that detect energy (e.g., photons of light) reflected from object(s), may detect the energy/reflections more than one time. As one example, a "Geiger-mode" avalanche photodiode (APD) sensing device or other sensing device may detect energy of a reflection(s) as a signal with a particular signature. The particular signature of the energy, in one embodiment, conforms to an intensity profile that includes one or more returns. Thus, a signature for the reflection can include a first return and a second return (also referred to as a dual-return) of an emitted light pulse or ambient light detection. For example, when the light pulse is incident upon an edge of an object and also a surface or other object that is proximate to the object, a single pixel can detect return signals of the emitted light twice or more. This is especially true in relation to small objects such as roadway tire debris, rocks, sticks, and other objects which include few field points and edges that are spanned by pixels of the detector. That is, in smaller objects edge features and thus the edge points may generally dominate the object thereby influencing how the smaller object can be detected. Thus, the presently disclosed systems and methods leverage this aspect of the return data detected by the sensor to identify edges and detect the objects from the identified edges. In this way, the present systems and methods improve the ability to detect objects within point cloud data.

In one embodiment, an edge detection system for improving detection of objects in a surrounding environment is disclosed. The edge detection system includes one or more processors and a memory communicably coupled to the one or more processors. The memory storing a scanning module including instructions that when executed by the one or more processors cause the one or more processors to, in response to emitting a signal pulse, acquire point cloud data about the surrounding environment as identified from the signal pulse reflecting from the surrounding environment. The memory storing a detection module including instructions that when executed by the one or more processors cause the one or more processors to determine which data points within the point cloud data are edge points by distinguishing the edge points from field points in the point cloud data according to edge characteristics. The detection module further includes instructions to identify an object in the surrounding environment according to a segment of the point cloud data that is bound by the edge points.

In one embodiment, A non-transitory computer-readable medium for improving detection of objects in a surrounding environment is disclosed. The non-transitory computer-readable medium including instructions that when executed by one or more processors cause the one or more processors to perform various functions. The instructions include instructions to, in response to emitting a signal pulse, acquire point cloud data about the surrounding environment as identified from the signal pulse reflecting from the surrounding environment. The instructions include instructions to determine which data points within the point cloud data are edge points by distinguishing the edge points from field points in the point cloud data according to edge characteristics. The instructions include instructions to identify an object in the surrounding environment according to a segment of the point cloud data that is bound by the edge points.

In one embodiment, a method for improving detection of objects in a surrounding environment is disclosed. The method includes, in response to emitting a signal pulse, acquiring point cloud data about the surrounding environment as identified from the signal pulse reflecting from the surrounding environment. The method further includes determining which data points within the point cloud data are edge points by distinguishing the edge points from field points in the point cloud data according to edge characteristics. The method includes identifying an object in the surrounding environment according to a segment of the point cloud data that is bound by the edge points.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
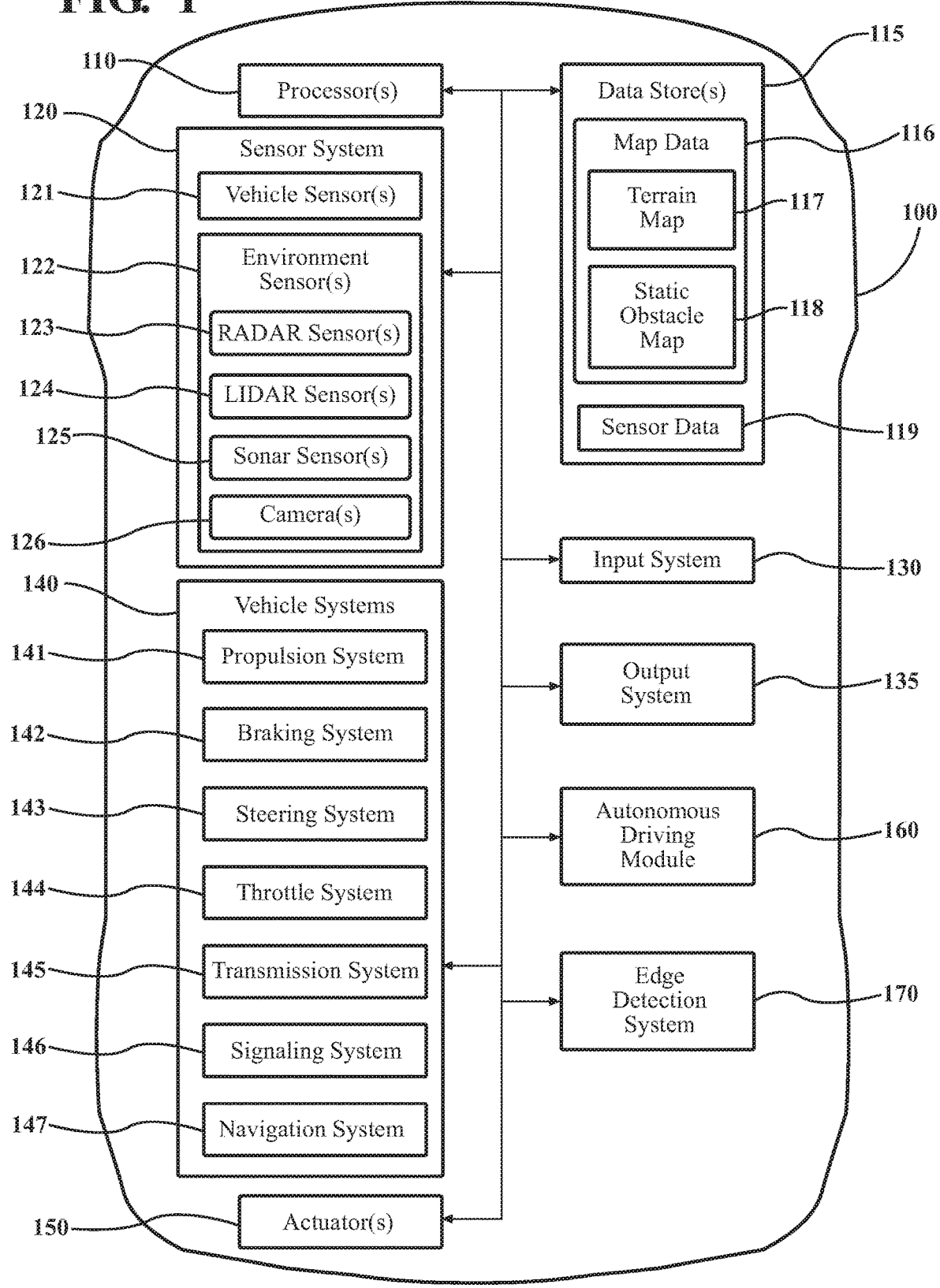
FIG. 1 illustrates one embodiment of a vehicle within which systems and methods disclosed herein may be implemented.

Systems, methods, and other embodiments associated with detecting objects in a field of view of a sensor using an edge detection technique are disclosed. As mentioned previously, electronically perceiving objects using electronic sensors can be a difficult task. In particular, perceiving relatively small objects can represent a significant difficulty. Because sensors may acquire few data points about an object that is relatively small, the sensor may encounter difficulties with recognizing the sparse collection of data points as being part of an object. In general, "sensing resolution" depends on various aspects of the sensing device and can dictate how well the particular sensing device recognizes objects of varying characteristics (e.g., small, large, etc.). As such, in order to detect small objects, the sensing resolution of the sensing device (e.g., the LiDAR 124) should of a fine enough characteristics that spacing between pixels satisfy a threshold (e.g., narrower than the threshold) for providing a point cloud have a sensing resolution that provides for detecting smaller objects. In this way, information about smaller objects can be distinguished from the point cloud to provide detection of the smaller objects for autonomous driving systems (e.g., level 4 or level 5 autonomous systems). This can be especially true when considering how the object may be situated in different poses/orientations, and at different angles/distances from the sensor.

Therefore, in one embodiment, a disclosed edge detection system and disclosed edge detection methods improve the ability of the sensor to detect objects by leveraging characteristics of data points associated with the objects. For example, consider an embodiment of a light detection and ranging (LiDAR) sensor. In general, the LiDAR emits a pulse of light to scan a field of view within a surrounding environment. From reflections of the pulse of light, the LiDAR generates a point cloud that represents the distance between the sensor and points in the field of view that reflected the pulse.

Thus, by way of example, a vehicle in the field of view reflects the pulse of light, which is then detected by the LiDAR and interpreted into distinct points that each are associated with a distance from the LiDAR as determined according to a time of flight for the pulse to travel from the LiDAR to the vehicle and back to the LiDAR. Accordingly, because different parts and features of the vehicle are at varying distances from the LiDAR, the general shape of the vehicle is embodied in the associated point cloud data as defined through the relative distances.

The LiDAR includes, in one embodiment, an array of photodetectors that separately correlate with points/pixels in the point cloud. In some instances, individual pixels within the detector detect a second return (e.g., second return signal of a data point indicating a dual-return) of the emitted light pulse. For example, a single pixel is oriented to overlap an edge of an object. Thus, the single pixel detects a first return from the object that is in the foreground and a second return from another object/surface that is proximate to the object. In other words, when a single pixel detects a reflection of the light pulse that is incident on an edge or near an edge of the object and also a surface or other object that is proximate to the incident object, the single pixel in the detector can detect the emitted light twice or more. The occurrence of such a second return signal and potentially additional return signals within the point cloud data can be especially significant in relation to small objects such as roadway debris, rocks, sticks, and other objects of which an edge can be significant aspect that dominates point cloud data associated therewith. That is, because smaller objects are generally dominated by edge features and thus may be represented in the point cloud by fewer field points (i.e., data points within a body of the objects), the edges can be, for example, more prominent and useful for detecting the actual object.

Consequently, the edge detection system analyzes the point cloud data to identify data points having edge characteristics. In general, the edge characteristics include a profile that is indicated by two separate spikes (i.e., detections) separated by an amount of time within a single pixel of the detector. As previously indicated, this characteristic of a having a dual-return profile that is comprised of a first return and a second return is caused by the pulse being reflected from a first object and from another surface or a second object that is proximate to an edge of the first object and being detected within a single pixel of the detector. Thus, the edge detection system can annotate or otherwise identify the data points that have the edge characteristics and then further analyze the edge data points.

The edge detection system further analyzes the edge points by, in one approach, comparing the edge points from both a spatial perspective and according to the edge characteristics of the respective points. That is, the edge detection system can compare a relative position between data points having profiles that include both a first return and a second return (e.g., spacing and intensities of pixels with the two returns) to determine whether points correspond to a same edge. After estimating edges of the object from the identified edge points, the edge detection system can further determine whether the edges bound/form an object. If the edge detection system determines that the edges define an object, then the associated data points can be segmented from the point cloud data for further processing to identify the class/type of the object or to simply annotate the points as being on the object.

In either case, the presently disclosed systems and methods leverage the characteristics of the edge data points within the detected point cloud to identify edges and detect the objects. In this way, the present systems and methods provide an improved approach for detecting the boundary/isolation of the objects within point cloud data.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes a LiDAR sensor or similar sensor and thus benefits from the systems and methods disclosed herein. Moreover, in further embodiments, the disclosed systems and methods are implemented within a stand-alone sensor device that is mobile or that is statically mounted for scanning an area.

In either case, the disclosed systems and methods will generally be discussed along with the vehicle 100, which also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes, in one embodiment, an edge detection system 170 that is implemented to perform methods and other functions as disclosed herein relating to analyzing point cloud data to detect objects. It should be appreciated, that while the edge detection system 170 is illustrated as being a part of the vehicle 100, in various embodiments, the edge detection system 170 is a separate component from the vehicle 100 that can be provided as a centralized server, a cloud-based service, and so on. Moreover, the edge detection system 170, in various embodiments, is implemented as part of a LiDAR sensor 124, a laser detection and ranging (LaDAR) sensor, a sonar sensor 125, or another suitable sensor that emits signals into a field of view within the surrounding environment and detects reflections of the emitted signals to determine information therefrom. Moreover, as previously indicated, the particular sensor within which the edge detection system 170 is embodied may be a standalone sensor or can be integrated within a vehicle, plane, or other mobile or static structure. The noted functions and methods will become more apparent with a further discussion of the figures.

Figure 2:
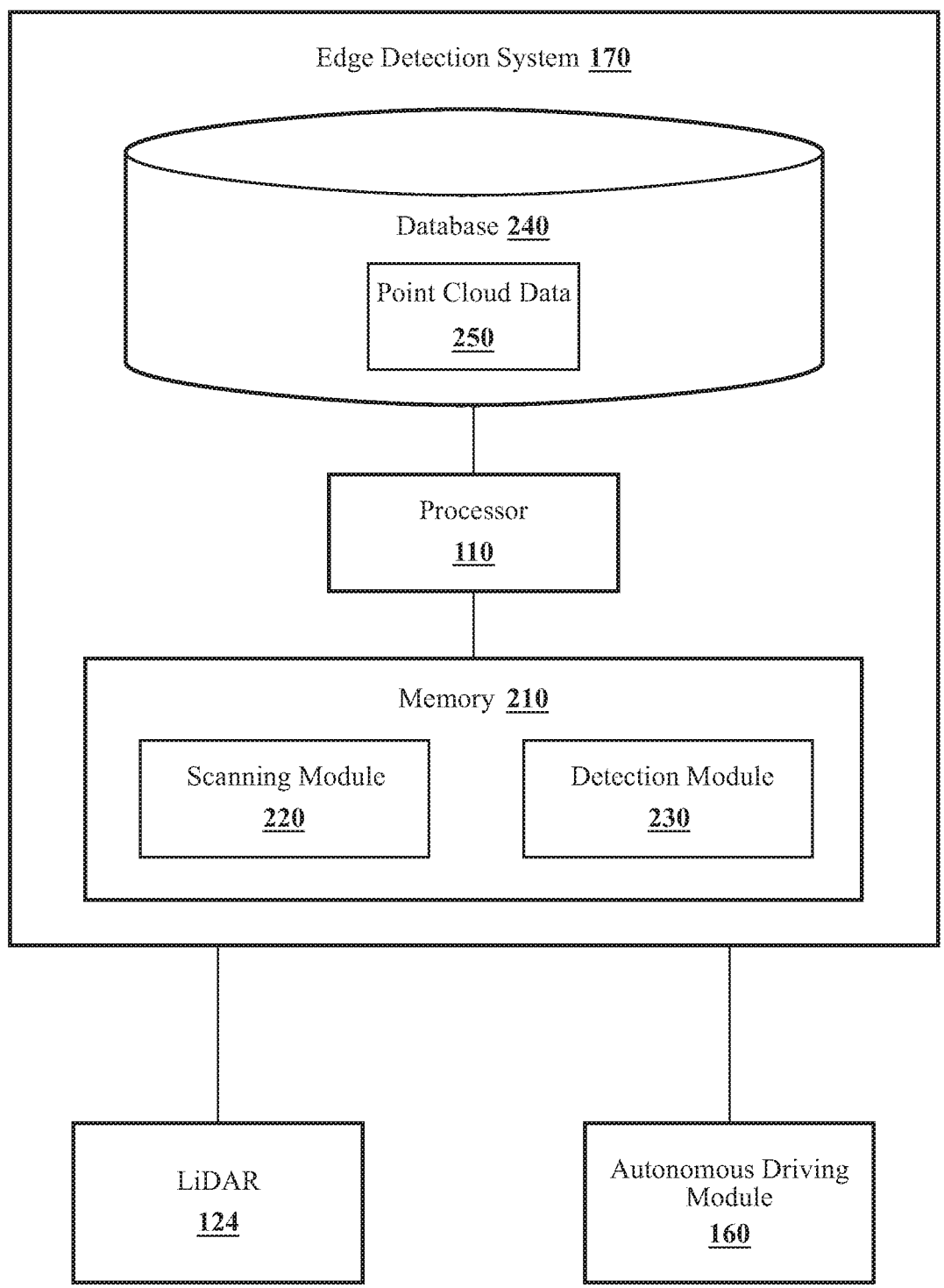
FIG. 2 illustrates one embodiment of an edge detection system that is associated with identifying edge points within a point cloud to detect objects associated with the edge points.

With reference to FIG. 2, one embodiment of the edge detection system 170 of FIG. 1 is further illustrated. The edge detection system 170 is shown as including a processor 110 from the vehicle 100 of FIG. 1. Accordingly, the processor 110 may be a part of the edge detection system 170, the edge detection system 170 may include a separate processor from the processor 110 of the vehicle 100, or the edge detection system 170 may access the processor 110 through a data bus or another communication path. Alternatively, the illustrated processor 110 is, in one embodiment, an application specific integrated circuit or arrangement of logic that operates to implement the functions as noted herein.

In one embodiment, the edge detection system 170 includes a memory 210 that stores a scanning module 220 and a detection module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein. Moreover, as previously noted, it should be appreciated that while the edge detection system 170 is illustrated as being wholly embodied within the vehicle 100, in various embodiments, one or more aspects of the edge detection system 170 are implemented as cloud-based services, centralized OEM services, and so on.

In either case, in one embodiment, the scanning module 220 generally includes instructions that function to control the processor 110 to collect point cloud data 250 using the LiDAR sensor 124. While the scanning module 220 is generally discussed as controlling the LiDAR sensor 124, in further embodiments, the scanning module 220 controls a laser detection and ranging (LaDAR) sensor, the sonar sensor 125, or, more generally, any sensor that scans the surrounding environment within a field of view using emitted signals to sense objects in the field of view and from which points of data comprising a point cloud are gathered to represent the environment.

The point cloud data 250 includes, in one embodiment, observations about various aspects of a field of view of the LiDAR 124. The surrounding environment can be a scene through which the LiDAR 124 is traveling when attached to a vehicle (e.g., vehicle 100) or to another mobile device or a fixed area about the LiDAR 124 when mounted in a single position to acquire observations. In general, the LiDAR 124 scans a sub-region of the surrounding environment that corresponds to a field of view of the LiDAR 124. Thus, according to a particular implementation of the LiDAR 124, the region embodied within the field of view may differ in size/volume. A structure of the point cloud data 250 may vary according to different implementations but generally includes a collection of points with coordinates in 3D-space that are relative to the LiDAR sensor 124. That is, the points of the point cloud data 250 are generated as distance measurements between the LiDAR sensor 124 and an object/surface from which the emitted pulse was reflected. In one embodiment, the points of the point cloud data also include notations of a position/direction in 3D space relative to the LiDAR sensor 124. In further aspects, the points of the point cloud data 250 include information about an intensity of a reflected signal, indications of whether multiple/dual returns where observed for the same emitted pulse, timing between returns, amplitudes of returns, and so on. Thus, the separate points of the point cloud data 250 can include return profiles that generally embody a character of the detected signal.

As provided for herein, the scanning module 220 receives the point cloud data 250 from, for example, at least the LIDAR 124 or another sensor that generates similar data. Alternatively, or additionally, the scanning module 220, in various embodiments, also receives additional information along with the point cloud data 250, such as camera images, radar data, and, more generally, any information about objects, trajectories of the objects, and further aspects of the surrounding environment. However, the present discussion will generally be limited to the point cloud data 250.

Accordingly, in one embodiment, the edge detection system 170 includes the database 240 as a means for storing various data elements. The database 240 is, for example, an electronic data structure stored in the memory 210 or another electronic data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the noted point cloud data 250, and/or other information that is used by the modules 220 and 230.

Figure 3:
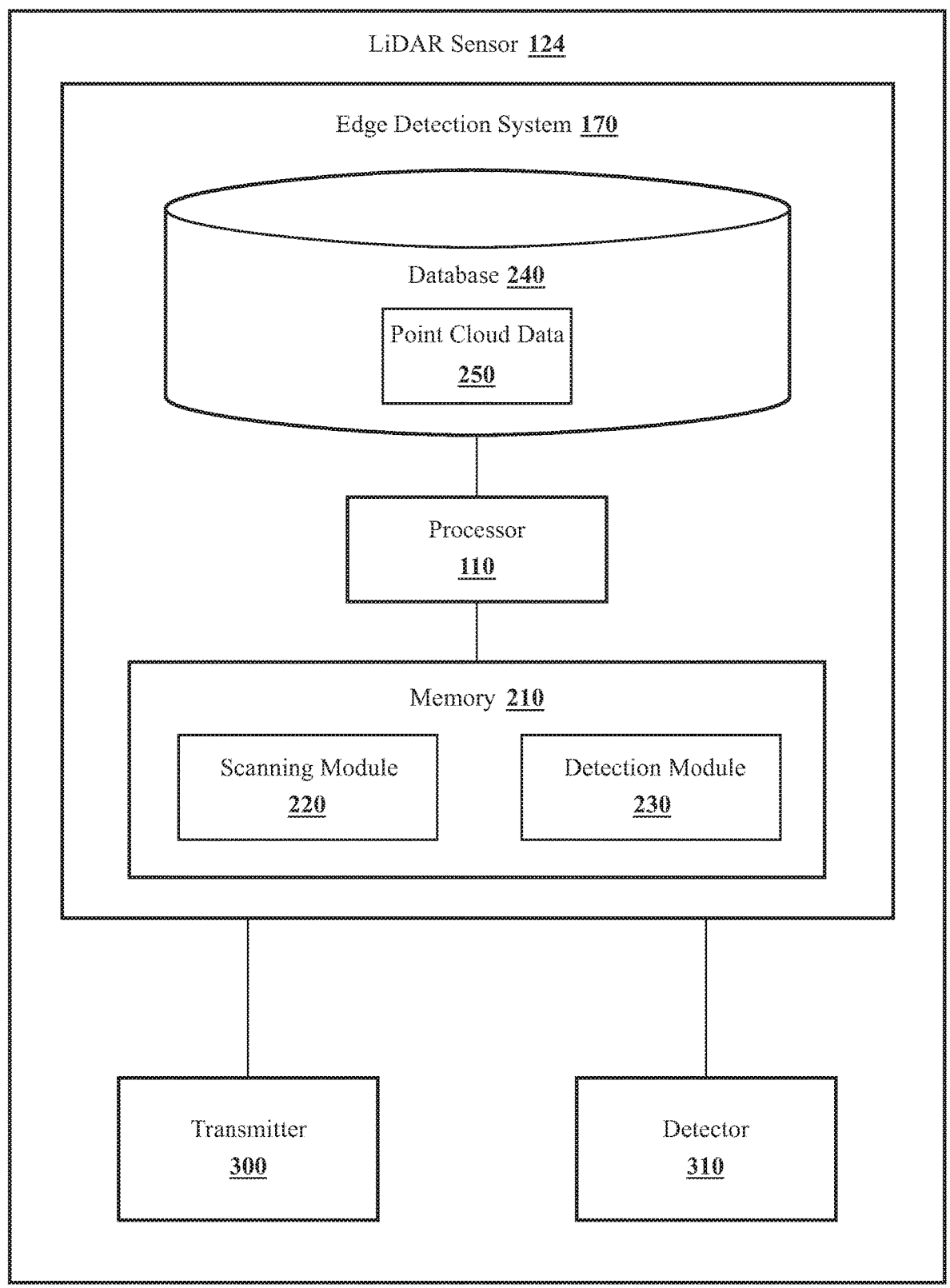
FIG. 3 illustrates one embodiment of an edge detection system that is integrated within a standalone LiDAR sensor.

A further embodiment of the edge detection system 170 is illustrated in relation to FIG. 3. As shown in FIG. 3, the edge detection system 170 is integrated as part of the LiDAR sensor 124. Thus, the edge detection system 170 is a subcomponent of the LiDAR sensor 124, and is implemented to control and/or interact with various components of the LiDAR sensor 124. For example, as illustrated, the LiDAR sensor 124 includes a transmitter 300 and a detector 310 in addition to the edge detection system 170. As a general matter, the edge detection system 170 may be connected by a bus or other operable connection with the transmitter 300 and the detector 310. In either case, the transmitter 300 generally functions to emit a beam/pulse of light throughout the field of view. In various implementations, the beam/pulse can be scanned throughout the environment in a sweeping manner using mechanical means, microelectromechanical (MEMS) systems, or through solid-state components (e.g., complementary metal-oxide-semiconductor (CMOS) components). As will be understood, the LiDAR sensor 124 can be implemented in many different forms. Thus, while a beam scanning LiDAR sensor is discussed other forms may be implemented. In general, the edge detection system 170 may control the transmitter 300 to emit the pulse/beam; however, further control circuitry can also be provided to perform such functions.

The detector 310 is, in one embodiment, comprised of a focal plane array (FPA) of photodetector pixels. The detector 310 functions to detect reflections of the emitted signal by generating electronic signals corresponding with light/photon that is incident on respective ones of the pixels. For example, the respective pixels generally correlate with different areas within the field of view as viewed from the LiDAR sensor 124. Thus, when the emitted pulse of light reflects from a surface/object and returns to the LiDAR sensor 124, the pixel that the reflected light is incident upon correlates with the location in the environment of the surface/object. Moreover, an intensity of the reflected light directly correlates with an amplitude of the electric signal generated by the respective one of the pixels. In this way, the detector 310 translates the reflected light into the point cloud data 250.

In either case, the scanning module 220 includes instructions that function to acquire the point cloud data 250 in response to the LiDAR 124 emitting a pulse of light into the field of view. In general, the scanning module 220 may control the LiDAR 124 to iteratively scan the environment by emitting light pulses at defined intervals. However, for purposes of the present discussion, a single scan and acquisition of the point cloud data 250 will be considered.

Accordingly, the detection module 230 initially scans the point cloud data 250 to identify points having edge characteristics. As previously mentioned, the edge characteristics include, in one embodiment, pixels with a dual-return effect. Consider FIG. 4, which illustrates a graph 400 of point characteristics (i.e., intensity signature or profile) of a single point in the point cloud 250. The graph 400 illustrates time along the x-axis and intensity of a detected signal along the y-axis. Thus, a first detected signal 410 represents a reflection from a first object or surface while a second detected signal 420 represents a reflection from a second object or surface of the same pulse of light that was emitted by the LiDAR 124.

Figure 4:
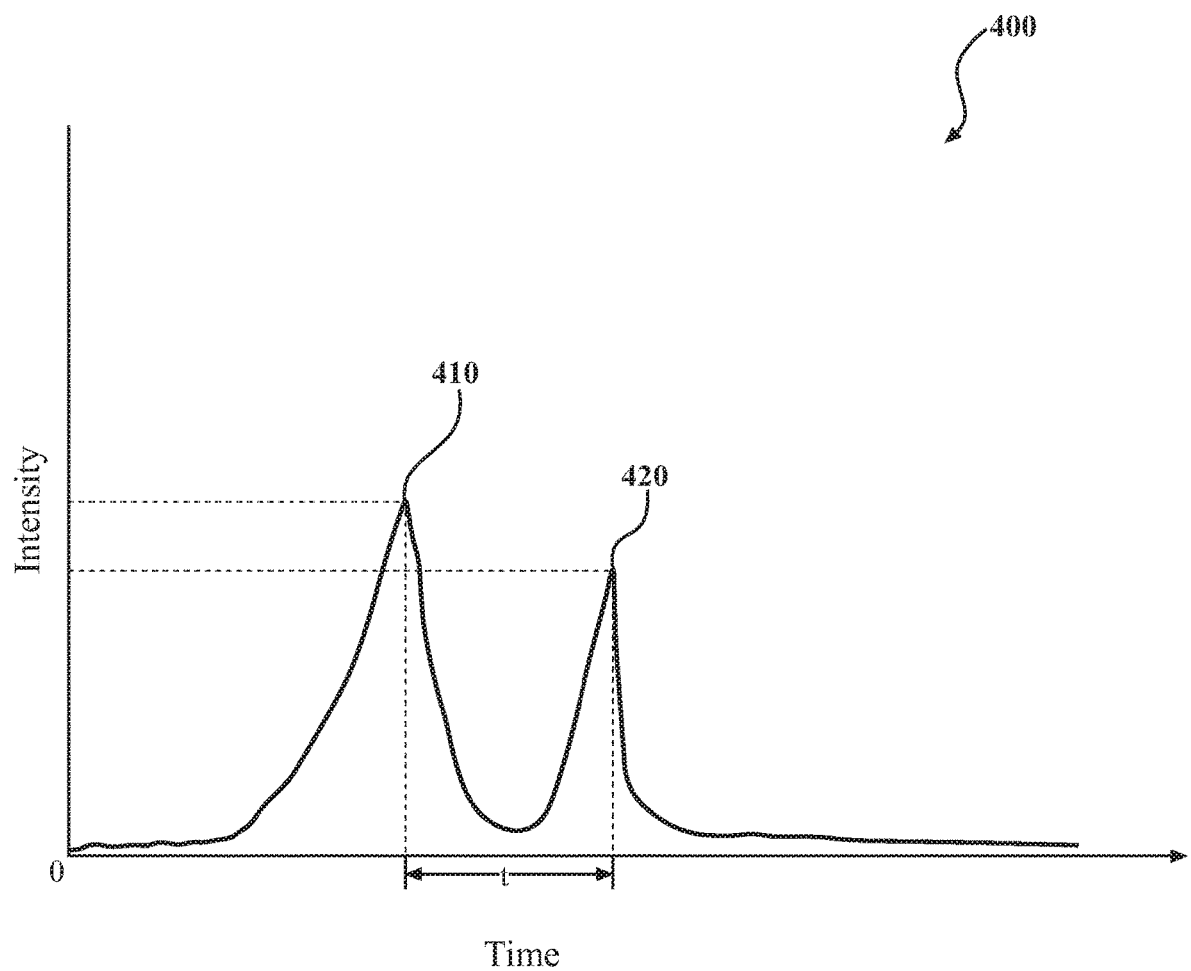
FIG. 4 illustrates one example of a graph that indicates characteristics of a dual-return pixel.

It should be appreciated that the first signal 410 generally correlates with an object that is closer than the second signal 420. This is because pulses detected by the detector 310, generally reflect a time-of-flight or round-trip time from when the pulse was originally emitted, reflected from an object/surface, and then detected at the LiDAR 124. Accordingly, pulses that occur subsequently in time to a first pulse can be inferred to have reflected from an object/surface that is further from an object/surface from which the first pulse reflected. Moreover, while objects that are further from the source of the emitted light may exhibit a decrease in amplitude when detected, the detected amplitude/intensity of a reflected signal is generally conditioned on several aspects such as surface characteristics, angles, atmospheric conditions, and so on. Thus, the amplitude/intensity and/or general waveform (e.g., frequency/phase) of the detected signal in relation to the emitted signal can be indicative of a surface/object from which the light reflected. Accordingly, the edge detection system 170 can use this point characteristic when determining whether two points are related (e.g., part of a same edge) as will be discussed subsequently. As an additional note, while FIG. 4 illustrates an intensity profile with two returns for a pixel, in further aspects, a pixel can exhibit three or more returns. Thus, while the discussion generally focuses on the dual-return effect, the noted aspects are extendable to pixels exhibiting three or more returns within an intensity profile.

Notwithstanding the fact that detected aspects of the points can be used to correlate different points of a same object, the points themselves exhibit various characteristics that can be leveraged by the system 170 to determine information about the field of view. As shown in the graph 400, an associated point is exhibiting edge characteristics since the graph 400 of the return profile is indicating two returns (e.g., a dual return) for the point as seen in the separate peaks 410 and 420. This configuration of the separate peaks within a single point indicates that the pixel spans two separate areas in the field of view of differing distances. Thus, depending on a separation of the peaks for the dual return, the distance can be slight or quite significant. In either case, the detection module 230 identifies the edge characteristics exhibited by the data of the point to determine that the point is likely an edge point of an object.

Moreover, in further aspects, the detection module 230 can infer on which edge of an object a detected point is likely located according to the particular characteristics of the dual return for the point. For example, because the spacing between the points generally indicates a distance between surfaces reflecting the light, a larger distance is likely associated with a top edge, whereas a shorter distance is likely associated with a bottom edge. This correlation is due to the observation that a bottom edge generally sits directly against the ground, whereas a top edge is set above the ground and the secondary reflection would then travel from objects that are behind and away from the detected edge at a greater distance. Accordingly, the detection module 230 can indicate this relationship as a function of the distance (t) peaks within the return profile.

Continuing with the operation of the detection module 230, once the detection module 230 identifies which points in the point cloud data 250 have edge characteristics and are, thus, likely edge points, the detection module 230 continues by, for example, annotating or otherwise labeling the points. Subsequently, the detection module 230 compares the identified edge points to determine whether the edge points form actual edges of an object or at least edge features in the field of view. In one embodiment, the detection module 230 compares characteristics of the edge points (i.e., whether profiles of the reflected signals are similar in amplitude and spacing), spatial relationships of the edge points (i.e., whether the points are proximate and fall along a line), gradients between the edge points (e.g., slopes/directions of lines), gradients within surfaces proximate to the edge points, or a combination of the noted approaches.

The detection module 230, in one embodiment, produces a listing of edges within the point cloud data 250 from the noted analysis of comparing the edge points. Accordingly, the detection module 230 can then analyze the listing of edges to determine whether the one or more sets of the edges substantially enclose or otherwise bound an object. The detection module 230, in one embodiment, employs a machine learning algorithm or another suitable approach to determine relationships between the identified edges and whether the identified edges define an object.

In either case, once the detection module 230 determines that the detected edges are indeed part of an object, the detection module 230 can label the points or area associated with the object. In one embodiment, the detection module 230 segments the points bounded by the edges from the point cloud data 250 and provide the segmented data points to an additional machine perception algorithm (e.g., neural network) to perform classification on the information such that a class/type of the object can be determined. In either case, the edge detection system 170 operates to improve detection of objects through the disclosed approach of detecting the edge points. In this way, the edge detection system 170 improves an ability of the LiDAR 124 to detect objects in a field of view and especially in relation to relatively small objects.

Figure 5:
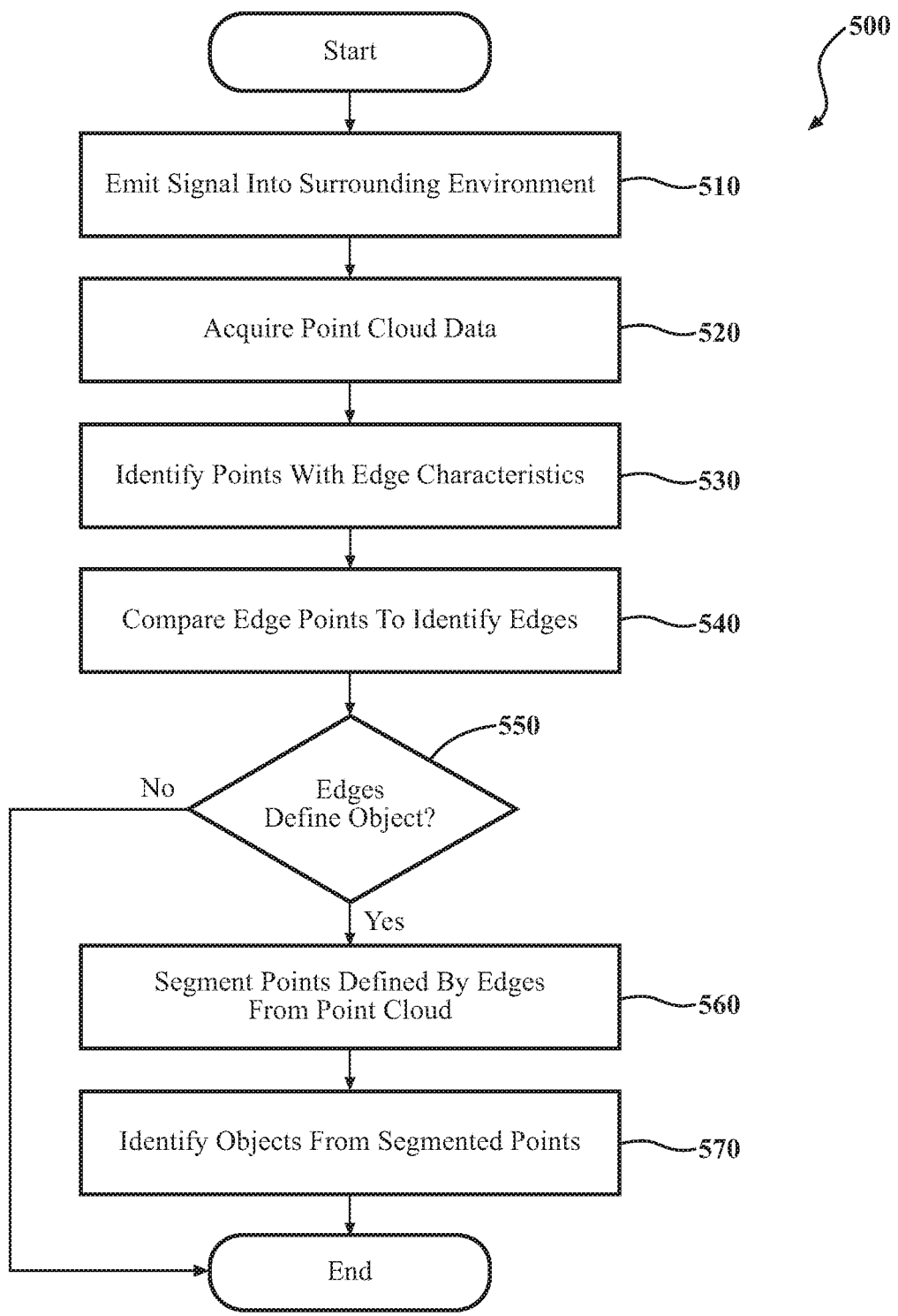
FIG. 5 illustrates one embodiment of a method that is associated with detecting objects using characteristics of edge points of the objects in a point cloud.

Additional aspects of detecting objects according to characteristics of edge points will be discussed in relation to FIG. 5. FIG. 5 illustrates a flowchart of a method 500 that is associated with analyzing point cloud data to detect objects. Method 500 will be discussed from the perspective of the edge detection system 170 of FIGS. 1, 2, and 3. While method 500 is discussed in combination with the edge detection system 170, it should be understood that the method 500 is not limited to being implemented within the edge detection system 170, but is instead one example of a system that may implement the method 500.

At 510, the scanning module 220 controls the LiDAR sensor 124 to emit a light pulse. In one embodiment, the scanning module 220 iteratively induces the LiDAR 124 to scan the field of view in a sweeping motion with the light. However, the focus of the present analysis is data acquired from a single scan of the environment, which may be executed separately for subsequent iterations. Moreover, while the LiDAR 124 and a light pulse are discussed, in further aspects, the disclosed approach can be extended to a LaDAR, a sonar, or other similar sensors. In either case, the general function provided at 510 by the scanning module 220 is to control or induce the LiDAR 124 to provide a sufficient scan of the field of view in order to illuminate surfaces and objects and provide an adequate detection thereafter.

Moreover, while active illumination and detection are generally discussed herein, in further embodiments, the disclosed systems and methods can employ passive techniques to detect objects. That is, the scanning module 220, in one embodiment, does not control the LiDAR 124 to actively emit light but instead detects objects passively through the use of ambient light that exists within the surrounding environment from lights, the sun, and so on. Consequently, in such an implementation, the scanning module 220 can initiate scanning at 510 but does not necessarily actively emit the light pulse.

At 520, the scanning module 220 acquires the point cloud data 250 about the field of view, as identified from the light pulse reflecting from the field of view. That is, as the light pulse reflects from objects in the field of view, the LiDAR 124 detects the reflected objects, and the scanning module 220 generates the point cloud data 250 therefrom. The point cloud data 250, as previously noted, generally includes ranging data about a distance and position in relation to the LiDAR 124 of a point of reflection. Thus, by acquiring a plurality of such points from the field of view, the scanning module 220 generates a substantially comprehensive observation of the field of view in the form of the point cloud data 250.

At 530, the detection module 230 determines which data points within the point cloud data 250 are edge points. In one embodiment, the detection module 230 distinguishes the edge points from field points in the point cloud data 250 according to edge characteristics that are exhibited by the edge points. Thus, the detection module 230 iteratively analyzes points in the point cloud data 250 to determine which data points of the point cloud data 250 include dual-returns as discussed previously in relation to FIG. 4. The detection module 230 can annotate or otherwise label the points as being edge points in order to identify the points for subsequent analysis. As a further matter, while the detection module 230 may annotate points that are determined to include the dual returns, it should be appreciated that in some instances, the labeled points may not actually be edge points.

For example, the detection module 230 implements a determination threshold or acceptable confidence interval in relation to the edge characteristics. That is, because the profile of a signal detected for a particular point can vary across a spectrum of possibilities according to various factors, the system considers a range of possibilities as indicating the edge characteristics so long as the edge characteristics satisfy, for example, a threshold that indicates a minimum amplitude of the dual returns and separation of the returns.

As an example, the various factors influencing the return profile can include a distance from the sensor to the edge, distances between the two surfaces overlapped by the single pixel, differences in surface characteristics (e.g., reflectivity, roughness, etc.), differences in poses of objects, and so on. Thus, the detection module 230 generally analyzes the points to determine which points exhibit the dual-return profile, but because of the different considerations that can also influence the detected signal, some points that exhibit reflections due to noise and interference may be identified as edge points. Thus, the subsequently discussed analysis at 540 can account for these discrepancies in order to better detect the edges themselves.

At 540, the detection module 230 compares point characteristics of successive ones of the identified edge points. In one embodiment, the detection module 230 compares the edge points to determine differences/similarities therebetween, and, thus, to identify whether the successive edge points form edges of features within the field of view. In general, the detection module 230 performs a direct comparison of point characteristics to determine if the points belong to a same edge. Thus, in one approach, the detection module 230 compares a return profile (e.g., as shown in FIG. 4) for point characteristics of one edge point with a return profile of point characteristics of another edge point to determine a similarity therebetween. The degree of similarity/difference in the profiles can indicate whether the edge points are part of the same edge. Thus, the detection module 230 may generate a mapping of the similarities between different points in order to characterize the edge points in a particular region and infer therefrom whether the edge points belong to a same edge. The similarity is indicative of whether the edge points are part of the same edge, because points along the same edge generally reflect light in a similar manner as a function of being a part of a same surface with a same reflectivity, angle to the LiDAR sensor 124, and other shared characteristics.

In further aspects, the detection module 230 can also analyze a spatial relationship (e.g., distance) and whether the edge points fit along an interpolated line, curve, or predefined pattern/form (e.g., 3D model of known objects) that links multiple edge points. In still further aspects, the detection module 230 can also analyze a gradient (i.e., slope/angle) of adjacent surfaces to estimate edges and determine correlations with the detected edge points. For example, changes in direction or degree of slope as may be indicated by the gradient can be indicative of locations of edges. Therefore, the detection module 230 can utilize the changes in gradients relative to the identified edge points to further inform the identification of the edges.

Moreover, the features can include more than objects. The features, in one embodiment, of which the detection module 230 identifies edges associated with include edges of roadways, curbs, cracks in surfaces, transitions that are within a body or face of an object, and so on. The noted features are in addition to objects (i.e., rigid body forms) in the field of view that are defined by a set of edges. Thus, the detection module 230 can utilize one or more of the noted approaches in determining the edges of the object and features, which are subsequently distinguished.

At 550, the detection module 230 analyzes the edges identified at 540 to determine whether the edges bound an object. In one embodiment, the detection module 230 analyzes the edges to determine whether the edges are line/segment features such as cracks, road edges, curbs, etc. versus being actual edges that define outer bounds of an object. Accordingly, the detection module 230 can analyze the edges to determine whether the edges substantially enclose a segment of the point cloud data that is associated with an object. The detection module 230, for example, determines whether the identified edges substantially bound or define a shape of an object such that the edges represent a cohesive collection that logically define the object. In one approach, the detection module 230 implements a machine learning algorithm such as a convolutional neural network (CNN) or another suitable algorithm to analyze the set of edges as an input and provide a determination of the presence of an object as an electronic output. If the detection module 230 determines that the edges are not part of an object, then the analysis of the present point cloud data 250 terminates. However, if the detection module 230 determines that the edges do correlate with an object(s), then the system 170 proceeds with processing as discussed at 560.

At 560, the detection module 230 segments the points of the object as defined by the edges from the point cloud. In one embodiment, segmenting the points includes simply annotating or labeling the points as belonging to the identified object(s). In further embodiments, the detection module 230 isolates the segment from the point cloud data 250. Thus, the detection module 230 can copy the points of the object to a working memory or another location. In either case, the detection module 230 specifically determines which points belong to the object and semantically labels or otherwise provides an indication of the points.

At 570, the detection module 230 analyzes the segment (i.e., the points of the object) to identify the object. In various implementations, the detection module 230 can employ different techniques for identifying the object from the associated points of the point cloud data 250. For example, the detection module 230 can use a point cloud recognition technique to generate a label of a class of the object. In further aspects, the detection module 230 uses a probabilistic approach, a machine learning approach, or another suitable approach for recognizing objects from point cloud data. As a further matter, the output of the method 500 is provided by the system 170, in one embodiment, to the autonomous driving module 160 for consideration in such aspects of autonomous operation or assisted operation of the vehicle 100 as path planning, object avoidance, and so on. In either case, the disclosed system and method function to improve detection (e.g., likelihood of detection) of objects through the use of point cloud data and detecting edges within the point cloud data.

Figure 6:
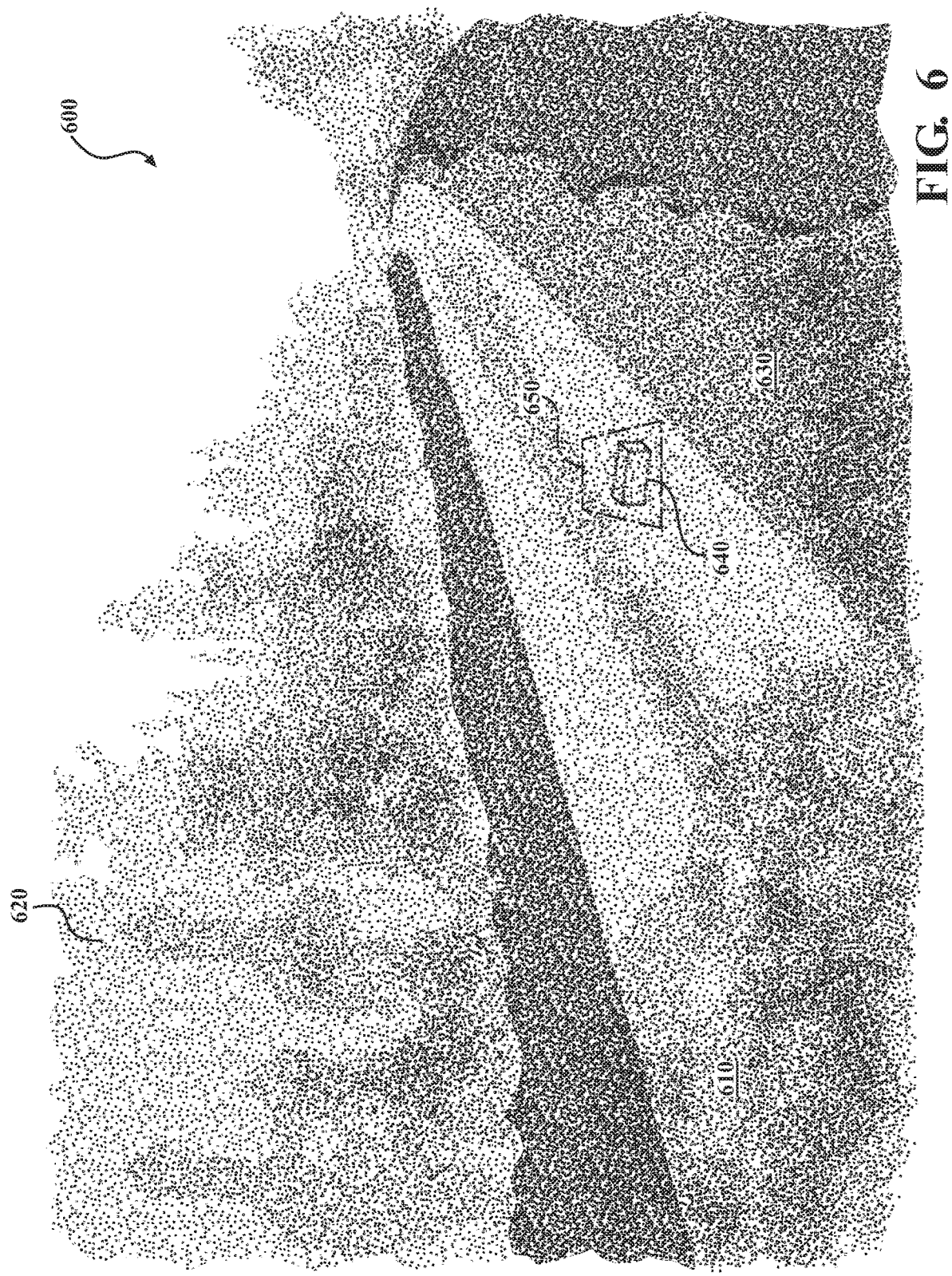
FIG. 6 illustrates one example of a point cloud acquired from scanning a field of view.
Figure 7:
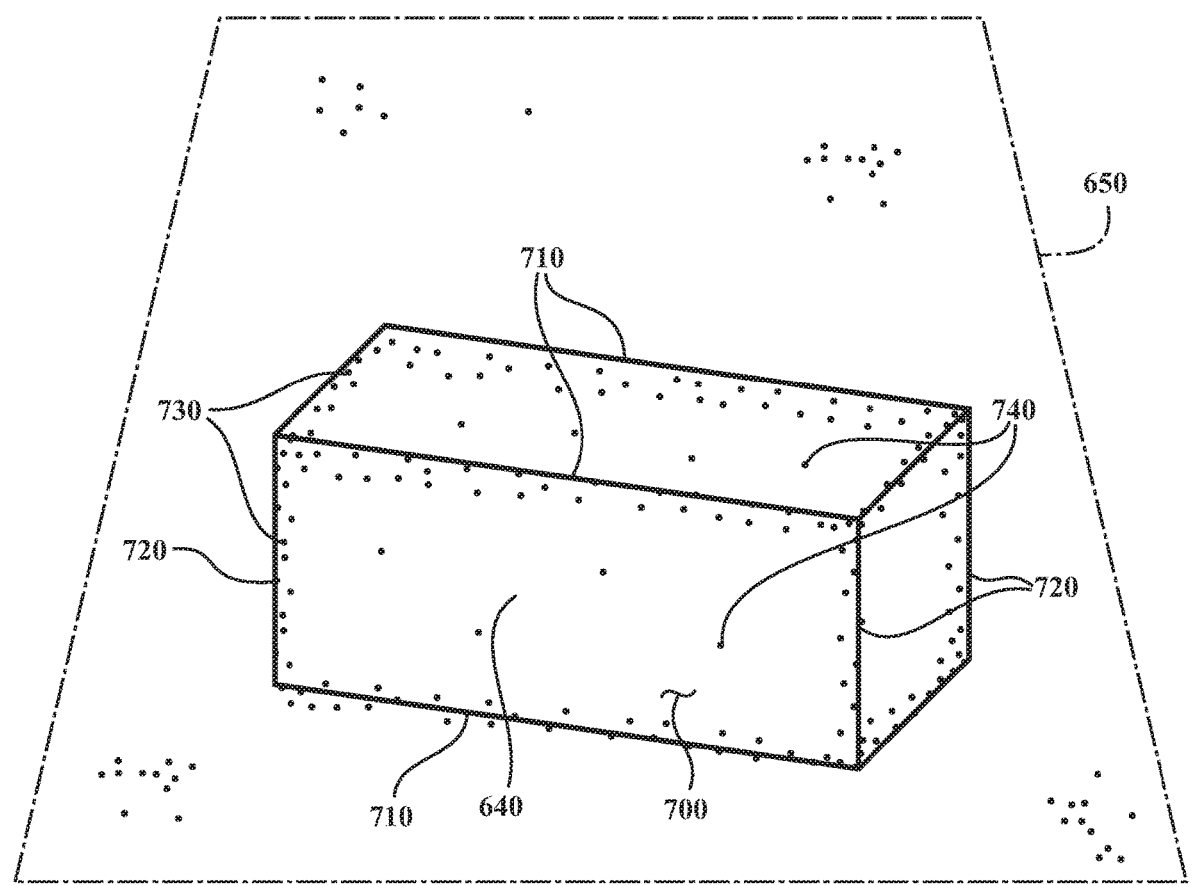
FIG. 7 illustrates one example of detected edges of an object within the point cloud of FIG. 6.

As a manner of providing further understanding of the present systems and methods, FIGS. 6-7 provide an example of point cloud data as may be analyzed by the edge detection system 170. Accordingly, as shown in FIG. 6, a point cloud 600 is illustrated that includes data points of a road 610, trees 620, roadside terrain 630, and an object 640 within the highway that is highlighted within a region 650. The point cloud 600 represents the noted objects and surfaces using a plurality of separate points as detected from scanning the field of view and detecting reflected light from the identified points. In one embodiment, each of the points includes at least information about a time-of-flight relating to when the point was detected after the initial light pulse was emitted by the LIDAR 124. As mentioned previously, the points may also include further information such as an intensity over-time of a detected waveform, as illustrated in FIG. 4.

In either case, the detected points within the point cloud generally include edge points, as previously described, and field points. The field points are those data points of the point cloud that are incident wholly within a body of an object/surface and do not overlap therebetween. For example, FIG.

7 illustrates a zoomed view of the region 650 of FIG. 6 including the object 640, which is shown as a cuboid shape for purposes of discussion, but in practice may be road debris (e.g., tire debris, sticks, rocks, etc.) or any other object. As seen in FIG. 7, a front surface 700 includes several field points 740 that are wholly embodied therein. By contrast, horizontal edges 710, and vertical edges 720 include several edge points 730 that overlap multiple surfaces and thus would provide for dual-returns. Moreover, from a comparative perspective of the number of field points 740 versus a number of edge points 730, the object 640 is generally represented by a greater number of edge points 730. Thus, as previously explained, edge points serve as a better mechanism for detecting smaller objects.

In either case, the detection module 230 analyzes the point cloud data of the region 650 and identifies the edge points 730. Subsequently, the detection module 230 compares the edge points 730 to determine which form different edges of the object 640. It should be noted that at this point of the analysis, the detection module 230 may not be aware of the object itself since the edges could instead be associated with line features in the environment such as, for example, cracks in roadways and other similar features. Thus, in one embodiment, the detection module 230 can reference gradients defined by associations between the field points 730, gradients/slopes of the edge points 730, spatial relationships between edge points, and so on to define the extents of the edges and whether the edge points 730 actually define an edge. It should be noted that as used herein, an edge refers to the feature defined when two surfaces intersect. Thus, as shown in FIG. 7, the detection module 230 extrapolates the vertical and horizontal edges according to the information inferred from at least the edge points 730.

Thereafter, the detection module 230 can define the edges according to the edge points 730, and determines whether the edges bound an object. Thus, as illustrated, the defined edges 720 and 730 define the object 640. As such, the detection module 230 can define the object as being detected. Thus, the detection module 230 may provide a simple binary determination that there is an object or not. In further aspects, the detection module 230 may provide dimensions associated with the detected object.

In still further aspects, the detection module 230 can segment the data associated with the object 640 from the point cloud data and perform additional object recognition/classification on the object so that a more precise determination about what the object is can be determined. In either case, the detection module 230 leverages the characteristics of the edge points to detect the edges of the object and define the object therefrom. In this way, the system 170 improves detection of objects within the field of view when using, for example, point cloud data.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information of one or more LIDAR sensors 124 of the sensor system 120. As an additional note, while the sensor data 119 is discussed separately from the point cloud data 250, in one or more embodiments, the sensor data 119 and the point cloud data 250 are the same electronic data stored in different storage locations or are stored together in a single repository.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, polarization cameras, near-infrared (NIR) cameras, medium wavelength (MWIR) cameras, and/or far infrared (FIR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the edge detection system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the edge detection system 170, and/or the autonomous driving module(s) 160 may control some or all of these vehicle systems 140 and, thus, may be partially or fully autonomous.

The processor(s) 110, the edge detection system 170, and/or the autonomous driving module(s) 160 can be operatively connected to communicate with the various vehicle systems 140 and/or individual components thereof. For example, returning to FIG. 1, the processor(s) 110, the edge detection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the edge detection system 170, and/or the autonomous driving module(s) 160 may control some or all of these vehicle systems 140.

The processor(s) 110, the edge detection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the edge detection system 170, and/or the autonomous driving module(s) 160 can control the direction and/or speed of the vehicle 100. The processor(s) 110, the edge detection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, objects, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules 160 described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving modules 160 either independently or in combination can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the point cloud data 250 as implemented by the detection module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An edge detection system for improving detection of objects in a surrounding environment, comprising:
   one or more processors;
   a memory communicably coupled to the one or more processors and storing:
   a scanning module including instructions that when executed by the one or more processors cause the one or more processors to acquire point cloud data about the surrounding environment as identified from a signal pulse reflecting from the surrounding environment; and
   a detection module including instructions that when executed by the one or more processors cause the one or more processors to determine which data points within the point cloud data are edge points by distinguishing the edge points from field points in the point cloud data according to edge characteristics,
   wherein the detection module further includes instructions to identify an object in the surrounding environment according to a segment of the point cloud data that is bound by the edge points, and wherein the detection module includes instructions to determine the edge points according to the edge characteristics including instructions to determine which data points of the point cloud data include dual-returns from the signal pulse reflecting from a first surface and from a second surface within an area observed by a pixel of a detector.

2. The edge detection system of claim 1, wherein the dual-returns are indicative of a data point for which the signal pulse is detected at two separate instances in time.

3. The edge detection system of claim 1, wherein the detection module includes instructions to compare point characteristics of successive ones of the edge points to identify whether the successive ones of the edge points form edges of features within the surrounding environment.

4. The edge detection system of claim 3, wherein the detection module includes instructions to compare the point characteristics including instructions to determine whether the successive ones of the edge points have substantially matching return profiles and whether a spatial relationship between the successive ones of the edge points correlates with an edge, and
wherein the return profiles indicate changes in intensity and timing between dual-returns, and wherein the spatial relationship is indicated by a relative position and a direction of a gradient of nearby points of the point cloud data.

5. The edge detection system of claim 3, wherein the detection module includes instructions to analyze the edges to determine whether the edges bound the object by determining whether the edges substantially enclose the segment of the point cloud data.

6. The edge detection system of claim 1, wherein the scanning module includes instructions to control a light detection and ranging (LiDAR) device to emit the signal pulse as a light pulse and to acquire the point cloud data in response to the light pulse reflecting from features in the surrounding environment, and
wherein the surrounding environment includes a field of view of the LiDAR device within which the LiDAR device acquires the point cloud.

7. The edge detection system of claim 1, wherein the detection module includes instructions to identify the object according to the segment including instructions to i) isolate the segment from the point cloud data as a function of edges defined by the edge points, and ii) analyze the segment using a point cloud recognition technique to generate a label of a class of the object.

8. The edge detection system of claim 1, wherein the edge detection system is integrated with a light detection and ranging (LiDAR) device.

9. A non-transitory computer-readable medium for improving detection of objects in a surrounding environment and including instructions that when executed by one or more processors cause the one or more processors to:
in response to emitting a signal pulse, acquire point cloud data about the surrounding environment as identified from the signal pulse reflecting from the surrounding environment;
determine which data points within the point cloud data are edge points by distinguishing the edge points from field points in the point cloud data according to edge characteristics; and
identify an object in the surrounding environment according to a segment of the point cloud data that is bound by the edge points,
wherein the instructions to determine the edge points according to the edge characteristics include instructions to determine which data points of the point cloud data include dual-returns from the signal pulse reflecting from a first surface and from a second surface within an area observed by a pixel of a detector.

10. The non-transitory computer-readable medium of claim 9, wherein the dual-returns are indicative of a data point for which the signal pulse is detected at two separate instances in time.

11. The non-transitory computer-readable medium of claim 9, wherein the instructions include instructions to compare point characteristics of successive ones of the edge points to identify whether the successive ones of the edge points form edges of features within the surrounding environment, and
wherein the surrounding environment includes a field of view of a sensor device within which the sensor device acquires the point cloud.

12. The non-transitory computer-readable medium of claim 11, wherein the instructions to compare the point characteristics include instructions to determine whether the successive ones of the edge points have substantially matching return profiles and whether a spatial relationship between the successive ones of the edge points correlates with an edge, wherein the return profiles indicate changes in intensity and timing between dual-returns, and wherein the spatial relationship is indicated by a relative position and a direction of a gradient of nearby points of the point cloud data.

13. The non-transitory computer-readable medium of claim 11, wherein the instructions include instructions to analyze the edges to determine whether the edges bound the object by determining whether the edges substantially enclose the segment of the point cloud data.

14. A method for improving detection of objects in a surrounding environment, the method comprising:
in response to emitting a signal pulse, acquiring point cloud data about the surrounding environment as identified from the signal pulse reflecting from the surrounding environment;
determining which data points within the point cloud data are edge points by distinguishing the edge points from field points in the point cloud data according to edge characteristics; and
identifying an object in the surrounding environment according to a segment of the point cloud data that is bound by the edge points, wherein determining the edge points according to the edge characteristics includes determining which data points of the point cloud data include dual-returns from the signal pulse reflecting from a first surface and from a second surface within an area observed by a pixel of a detector.

15. The method of claim 14, wherein the dual-returns are indicative of a data point for which the signal pulse is detected at two separate instances in time.

16. The method of claim 14, further comprising:
comparing point characteristics of successive ones of the edge points to identify whether the successive ones of the edge points form edges of features within the surrounding environment.

17. The method of claim 16, wherein comparing the point characteristics includes determining whether the successive ones of the edge points have substantially matching return profiles and whether a spatial relationship between the successive ones of the edge points correlates with an edge, wherein the return profiles indicate changes in intensity and timing between dual-returns, and wherein the spatial relationship is indicated by a relative position and a direction of a gradient of nearby points of the point cloud data.

18. The method of claim 16, further comprising:
analyzing the edges to determine whether the edges bound the object by determining whether the edges substantially enclose the segment of the point cloud data.

19. The method of claim 14, wherein emitting the signal pulse and acquiring the point cloud data include controlling a light detection and ranging (LiDAR) device, and
wherein the surrounding environment includes a field of view of the LiDAR device within which the LiDAR device acquires the point cloud.

20. The method of claim 14, wherein identifying the object according to the segment includes i) isolating the segment from the point cloud data as a function of edges defined by the edge points, and ii) analyzing the segment using a point cloud recognition technique to generate a label of a class of the object.

* * * * *